Figure 10:
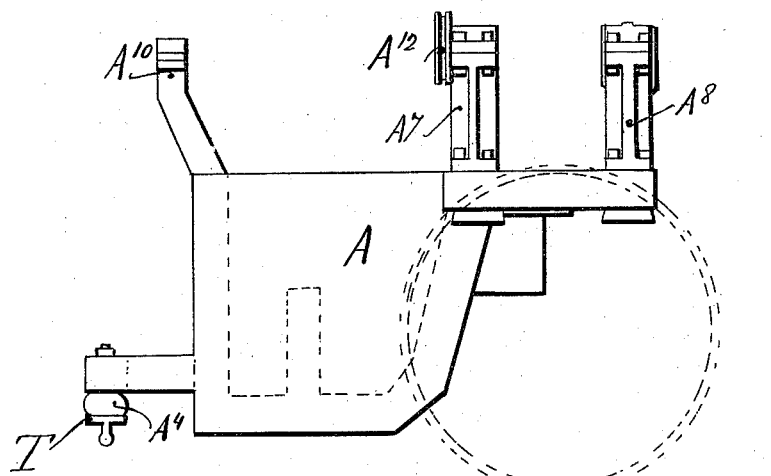

(No Model.) 9 Sheets—Sheet 1.
B. C. POLE.
STREET CAR MOTOR.
No. 561,433. Patented June 2, 1896.
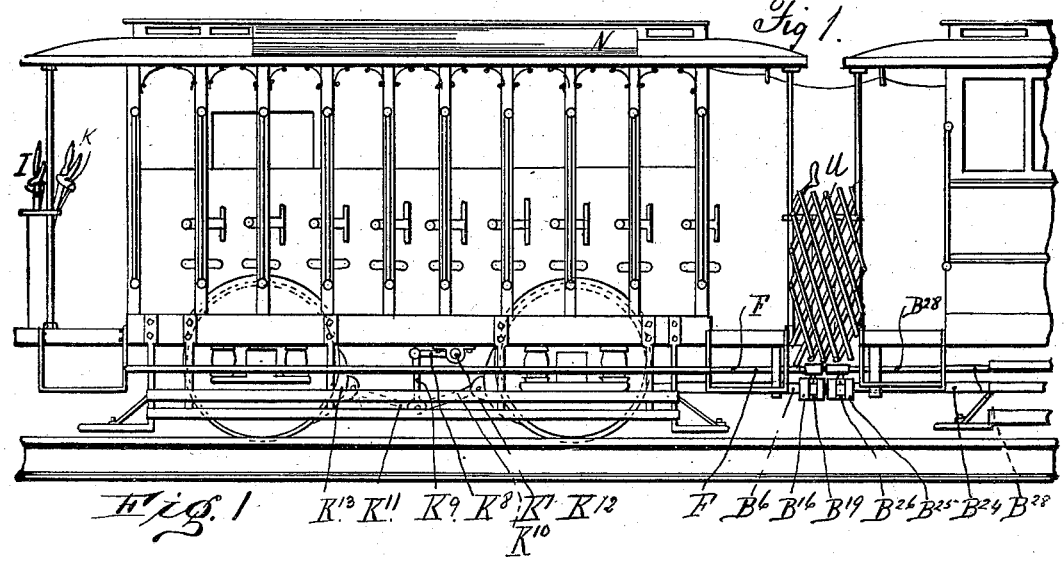
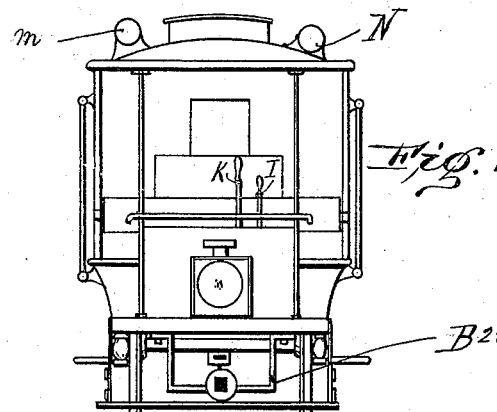
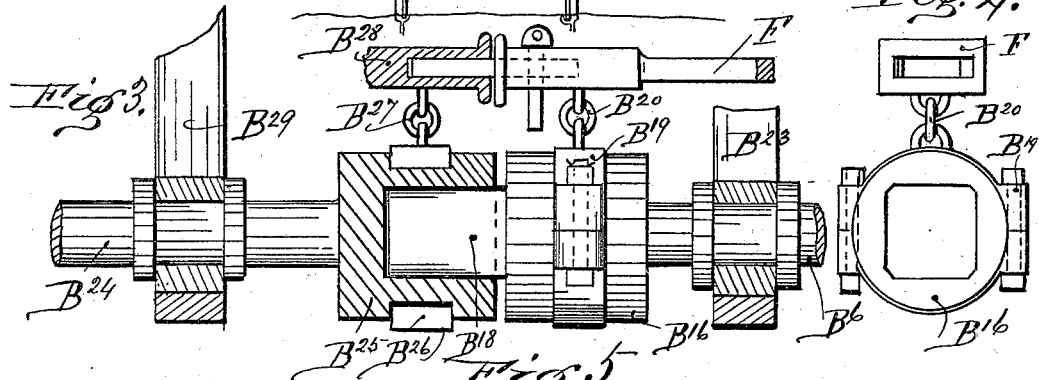
Witnesses:
Inventor
Benjamin C. Pole

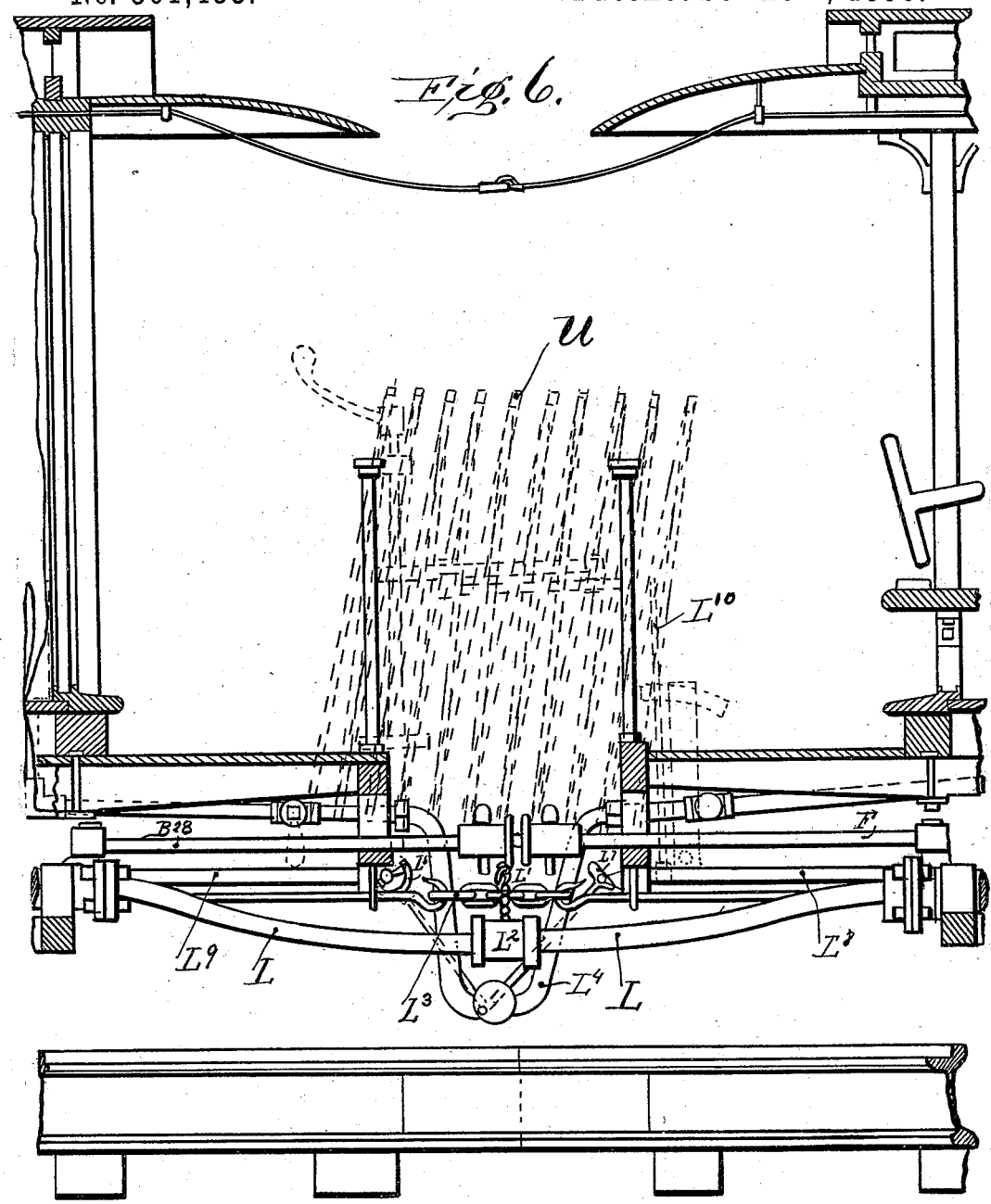

(No Model.) 9 Sheets—Sheet 3.
B. C. POLE.
STREET CAR MOTOR.
No. 561,433. Patented June 2, 1896.
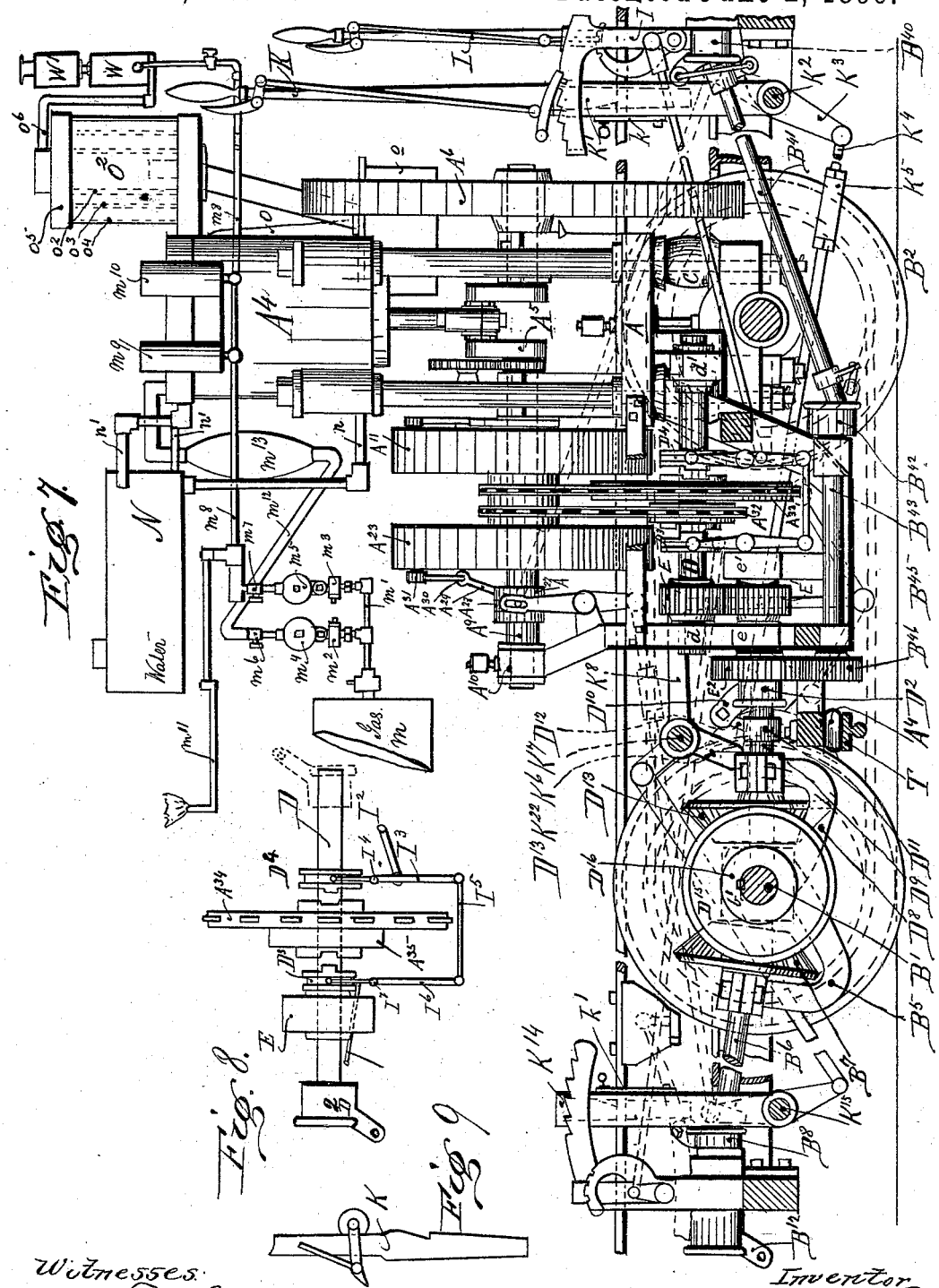
Witnesses
Inventor
Benjamin C. Pole (No Model.)

9 Sheets—Sheet 4.

B. C. POLE.
STREET CAR MOTOR.

No. 561,433. Patented June 2, 1896.

Witnesses:

Inventor
Benjamin C. Pole

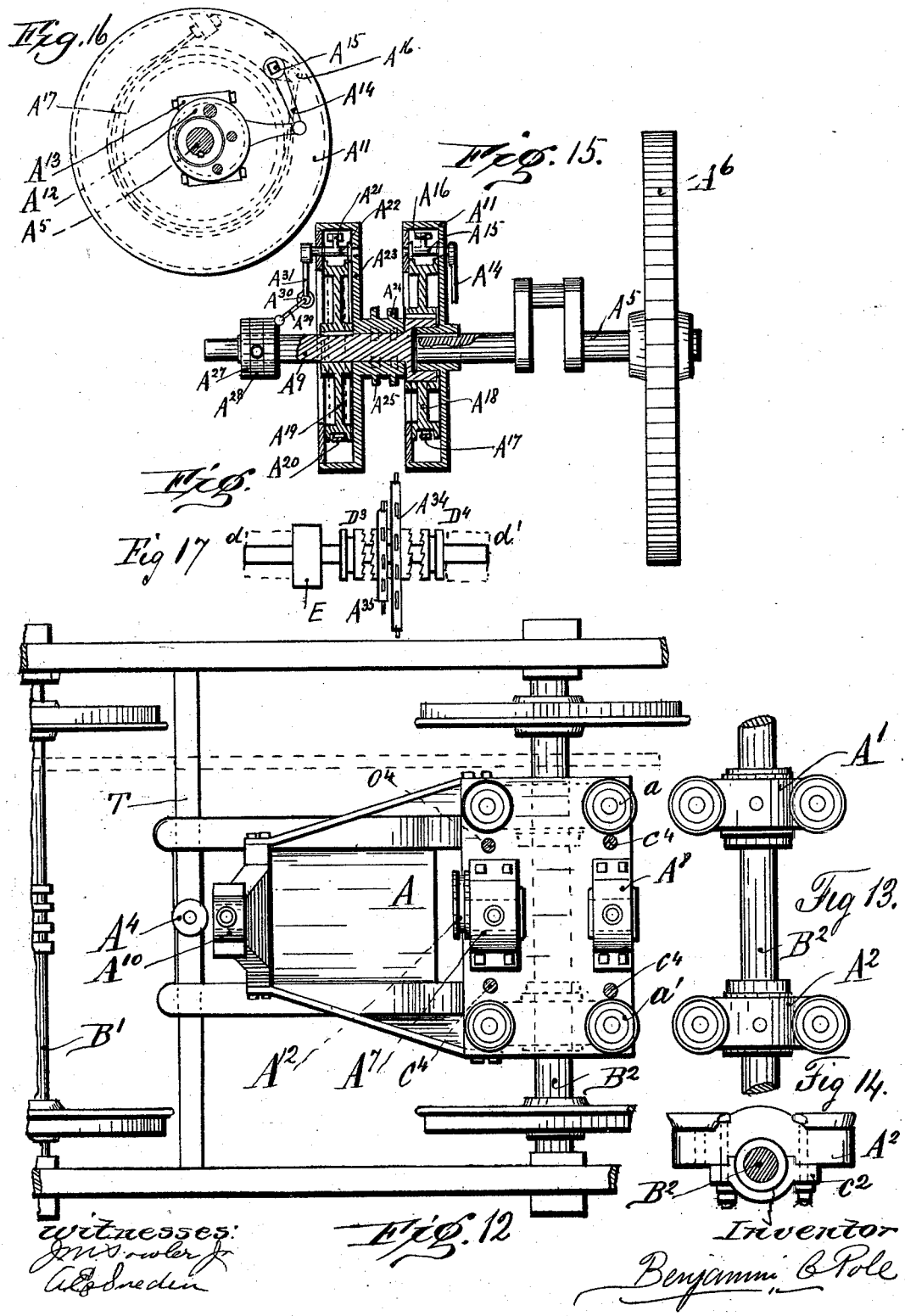

(No Model.)
B. C. POLE.
STREET CAR MOTOR.
No. 561,433. Patented June 2, 1896.
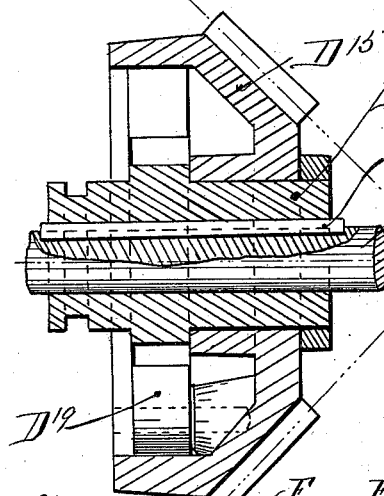
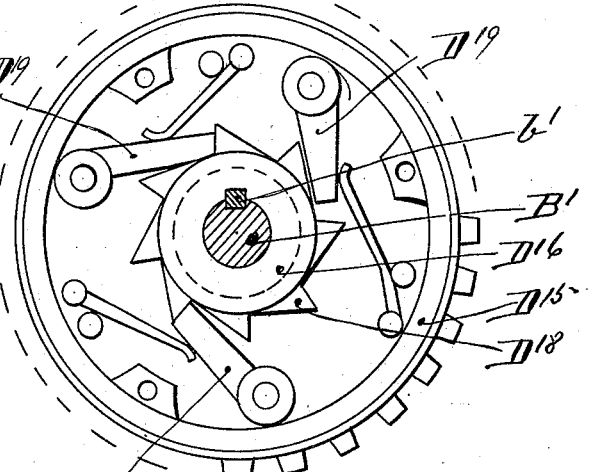
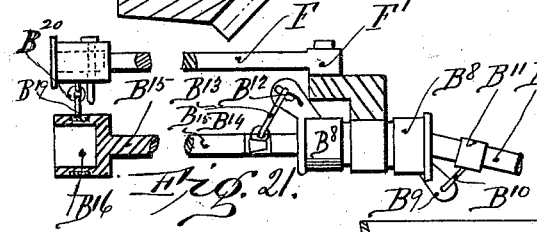
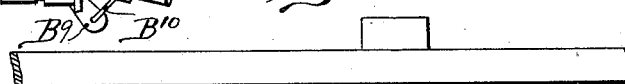
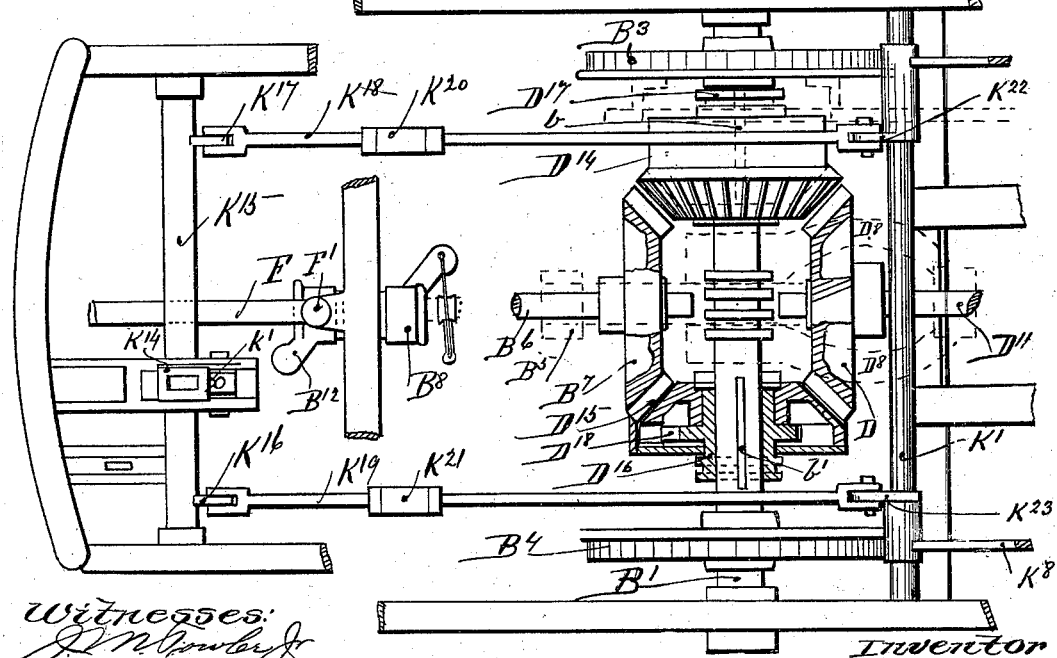
Witnesses:
Inventor
Benjamin C. Pole

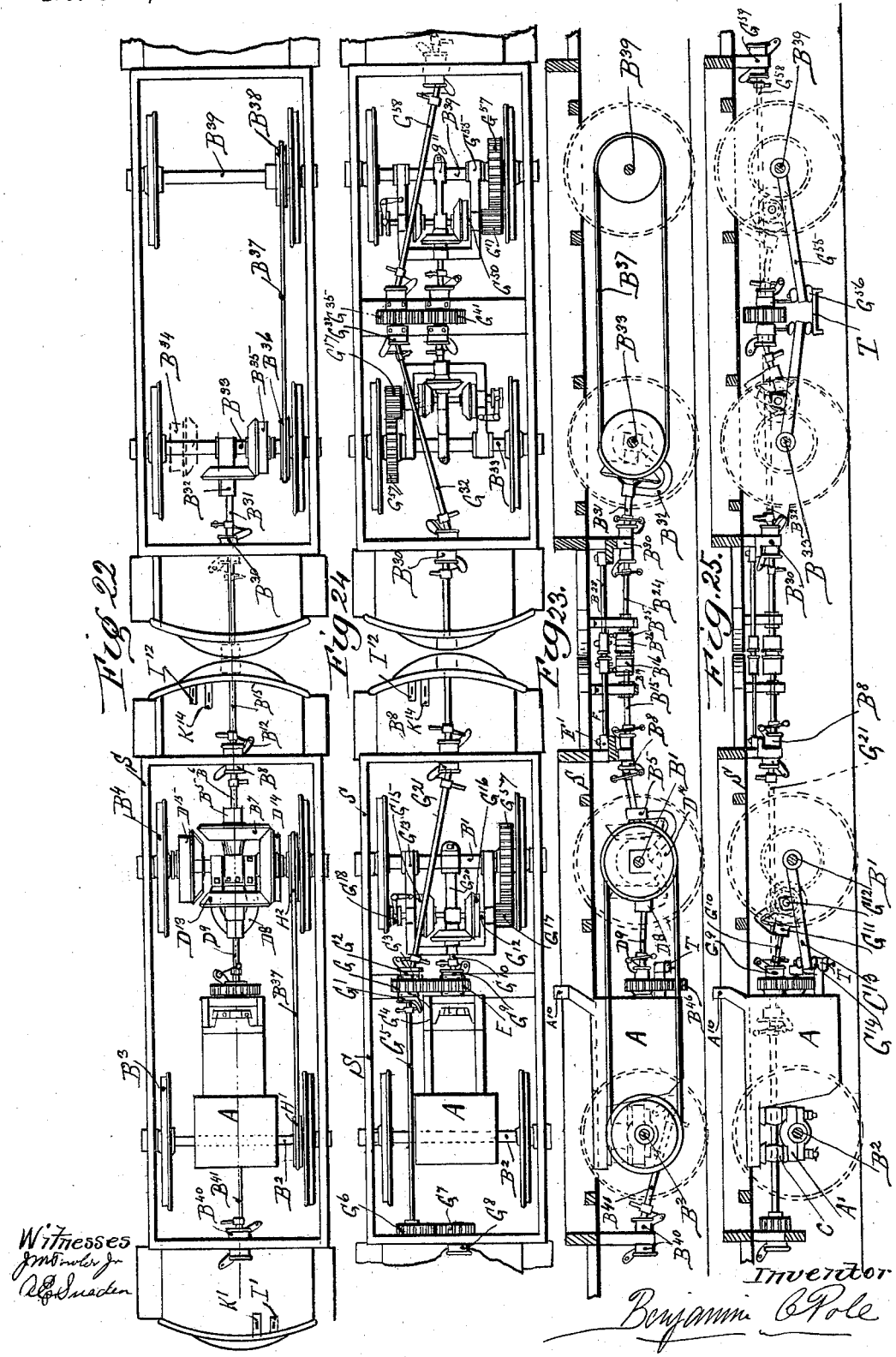

(No Model.) 9 Sheets—Sheet 8.
B. C. POLE.
STREET CAR MOTOR.
No. 561,433. Patented June 2, 1896.
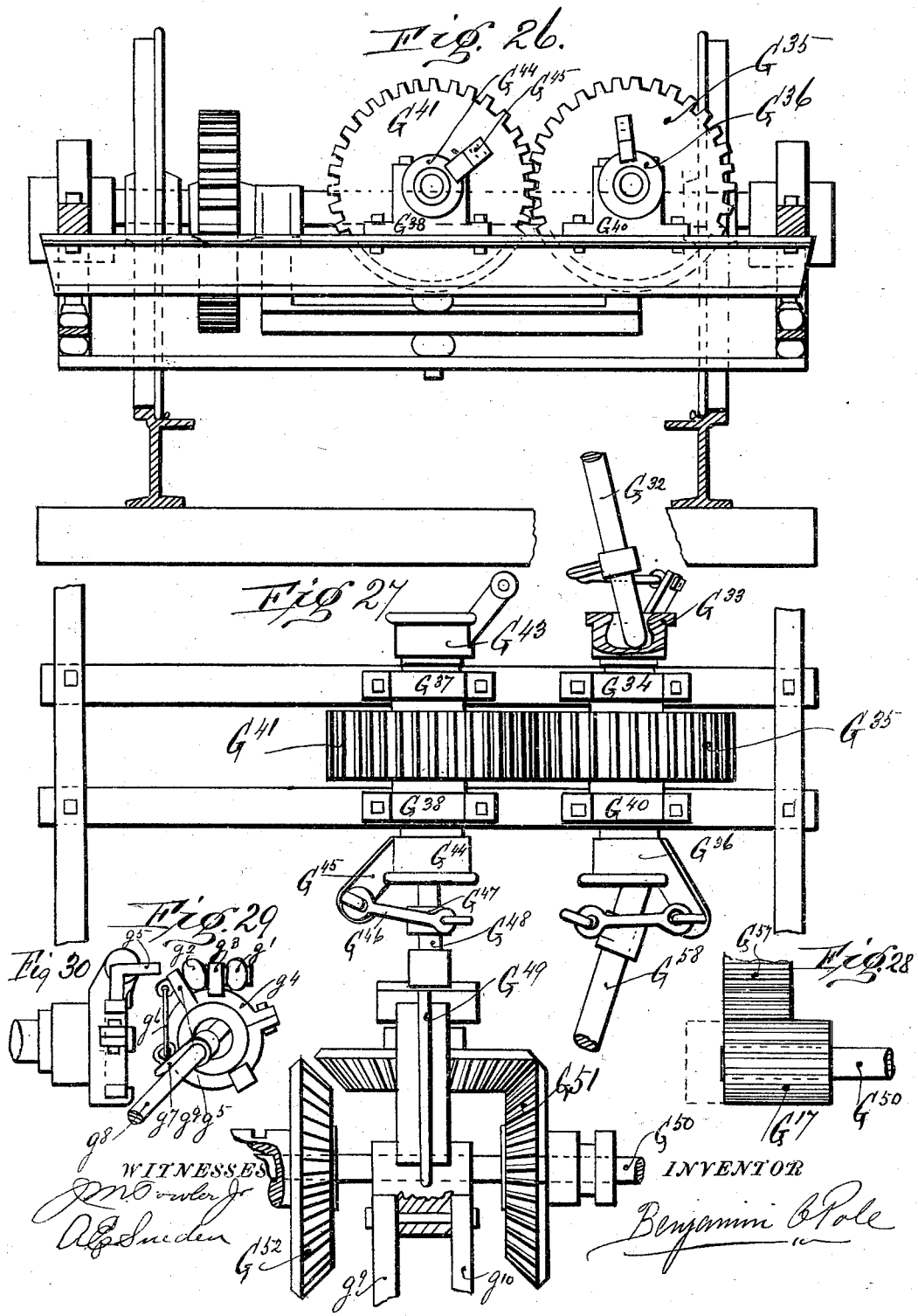
WITNESSES
INVENTOR
Benjamin C. Pole

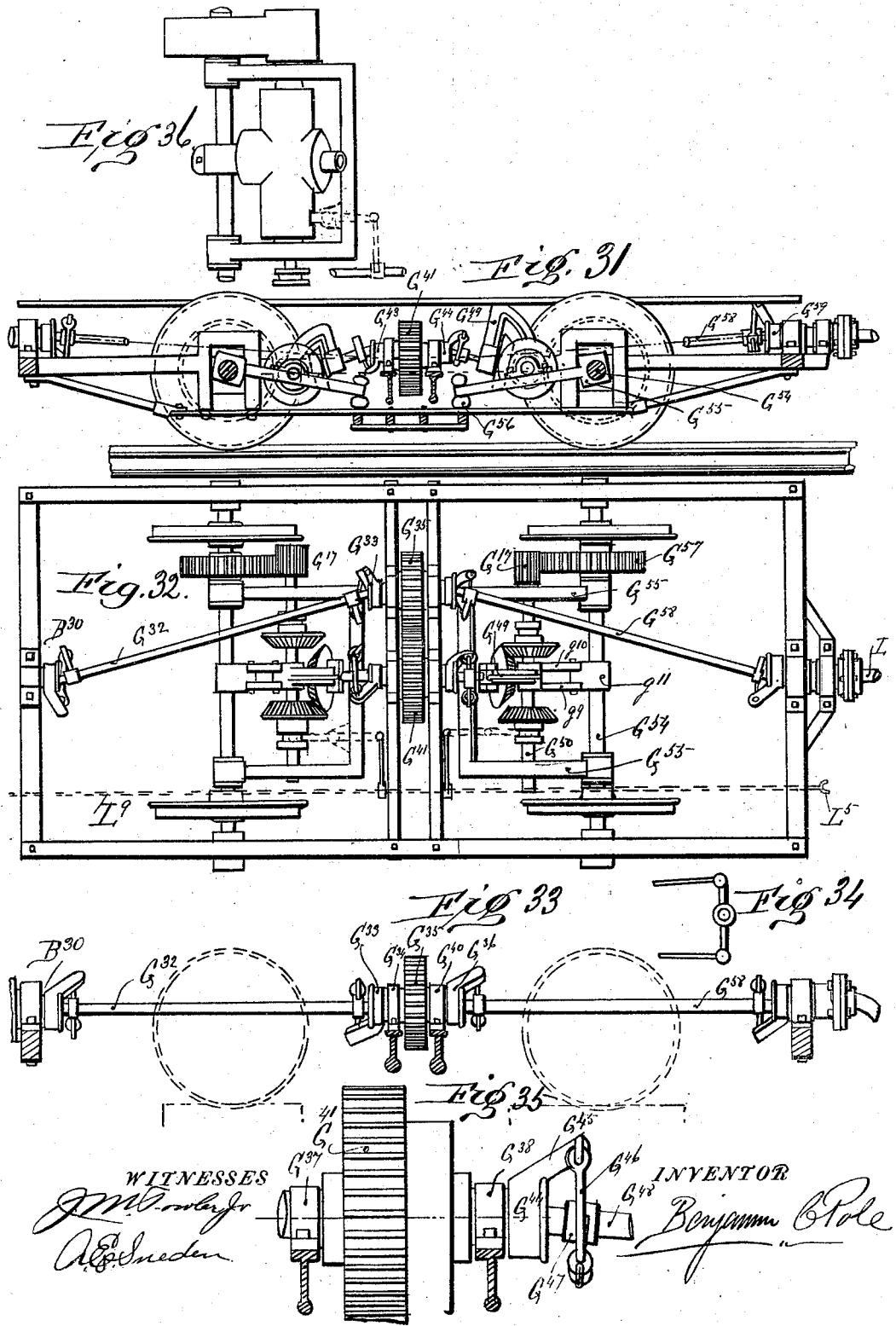

UNITED STATES PATENT OFFICE.

BENJAMIN CHARLES POLE, OF WASHINGTON, DISTRICT OF COLUMBIA.

STREET-CAR MOTOR.

SPECIFICATION forming part of Letters Patent No. 561,433, dated June 2, 1896.

Application filed March 6, 1896. Serial No. 582,069. (No model.)

*To all whom it may concern:*

Be it known that I, BENJAMIN CHARLES POLE, a citizen of the United States, residing at Washington, in the District of Columbia, have invented certain new and useful Improvements in Street-Car Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to provide an efficient apparatus for moving street-cars and trailers or other motive vehicle, and the manner of carrying out my invention is illustrated in the accompanying specification and sheets of drawings, which form part of this specification.

One object of my invention is to use up as many as possible of the existing constructions and parts of the present running-gears of street-cars by putting in a line-shaft in place of the armature-shaft, arranging beveled gears in place of the armature, these gears provided with escapements, and to reverse the direction of motion without reversing the engine-motor by simply shifting the gears; also, in providing a long-tooth gear-wheel which will remain in gear notwithstanding the changing of the beveled gears in the act of reversing.

A second part of my invention is in providing a spring-carriage which is inclosed underneath and is made to rest on springs, which said springs rest upon pedestals which are upon the car-axle, and the other end of the carriage is pivoted on a spring to the frame of the motor-carriage or street-car motor—an improvement on Letters Patent No. 188,672, dated March 20, 1877, and No. 221,900, dated November 18, 1879.

A third part of my invention is to provide the before-mentioned spring-carriage and mount thereon a motor-engine and to so arrange that engine as to have it and its journals all carried by the before-mentioned spring-carriage; also, to arrange two-speed-movement double friction-clutches, one for operating the energizer (see Patent No. 382,008, dated May 1, 1888) and the other for driving the motor; also, I provide universal joints between the spring-carriage and the axles of the carrying-wheels of the motor. This construction will permit the axles and their wheels to take the track and the spring-carriage to have an independent springing motion. I provide a gear-wheel to give motion to another gear-wheel for the transmission of power to the various line-shafts and gears for the purpose of giving traction to the driving-wheels directly under the motor and to the trailing car which shall follow the motor. I also provide suitable couplings and the means for the transmission of power by coupling from one vehicle to the other.

A fourth part of my invention is to give motive power to each of the supporting-wheels of the street-car motor and its trailer and to make an escapement device as near as possible to said wheel to take the motive power off of the engine-motor (which is mounted on the before-mentioned spring-carriage) either by a universal joint or by gears to shafts which are provided with universal joints, and run these shafts for the transmission of power from a central line of the vehicle at the couplings and pass this shaft to the side of the vehicle for the purposes of proper clearances and back to the center of the vehicle, so as to make a successful mechanical construction to carry out the object of this part of the invention; also, I make a special construction in the couplings, so as to enable shafts which are revoluble to be readily coupled. I also show an equivalent flexible shaft; also in the construction by which I am enabled to put the escapement device into the sliding beveled wheels themselves, the object of which is to prevent the teeth from clashing. I also apply the spring action in the universal joint belonging to the line-shafting. I also show the parts inclosed to prevent injury, being an improvement on Letters Patent No. 381,847, dated April 24, 1888, No. 401,855, dated April 23, 1889, and No. 206,093, dated July 16, 1878.

A fifth part of my invention is in providing double gas-regulators and igniting devices to the cylinder of the gas-engine, either electric or gas lighters, known in the art as "flame-lighters." I supply the gas from a supply-tank and after its use in the cylinder of the engine. I provide the ordinary exhaust-pot and exhaust-muffler and an exhaust-consumer, being a furnace to burn it up and deodorize it. I also provide an odorizer and a tank of water with circulating-pipes to keep cool the cylinder of the gas-engine—an improvement on Patent No. 335,479, dated February 2, 1886, and Patent No. 365,273, dated June 21, 1887.

A sixth part of my invention is to provide a single lever capable of working from either end of the car-motor for the purposes of driving the same, to operate the clutch of a friction-brake and the brake-shoes of the motor and its trailer, and preserve in the motions for working this lever the same motion to perform the same duty in driving when operated from either end of the car-motor; also, in providing a second lever to change the speed of the gear, which said lever shall also be capable of being operated from either end of the car-motor and this lever preserve the same movement to make the same change of gear when worked from either end of the car. The engine-motor upon this car is not reversed when the car-motor is reversed. The action of reversing is all made by the gears which shall be placed in gear. Any or all of the gears can be made of suitable material—steel, cast-iron, rawhide, or vulcanized fiber. I provide a vehicle to carry the motor-engine and also have a seating capacity on said car-motor. The engine-motor here shown may be operated by oil or compressed gas re-regulated to city pressure and used by the gas-engine, in which instance, when oil is used, the pressure-tank is charged with oil instead of gas. I use in connection therewith the exhaust-pot, the muffler, and an exhaust-consumer, a furnace to burn it up and deodorize. I provide an odorizer and a tank of water with circulating-pipes to keep cool the cylinder of the gas-engine.

Reference is had to the drawings, and to the letters of reference marked thereon, in which—

Figure 11:
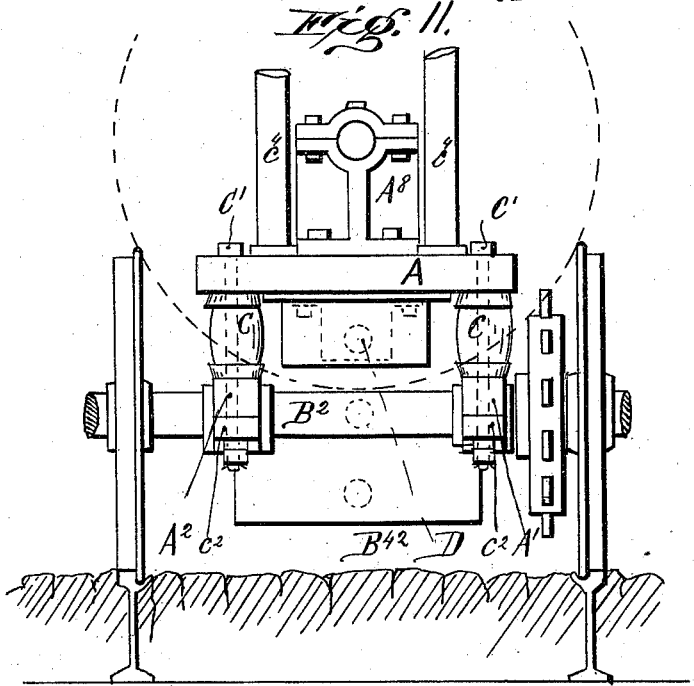

Figure 1 is a side elevation of my invention, showing a motor-car and part of the trailing car, the couplers for the draw-bars and revoluble shafts, also the lazy-tongs gate between the cars, also the seats for the passengers. Fig. 2 is a front view of the car-motor, showing the draw-bar coupling and the revoluble-line-shaft coupling and driving-levers. Fig. 3 is an enlarged view of the draw-bar and revoluble-line-shaft coupler, showing a means for supporting by braces; also shows the links and couplings in position. Fig. 4 is a front elevation of Fig. 3. Fig. 5 is a view of the hollow block which is used for coupling the revoluble line-shaft. Fig. 6 is an enlarged elevation showing the couplings between the car-motor and its trailer; shows the draw-bars and coupling-pins in position; shows the supporting-links from the draw-bar which connect to a revoluble collar which is upon a flexible shaft, an equivalent means of operating the line-shaft; shows the chain connection for the brake, the method for the reverse movement of the gearing, also shows a connecting-pipe for gas to or from the trailer-car to the motor. Fig. 7 is a sectional elevation, in part cross-section, of the car-motor, showing the arrangement for the driving-levers so as to permit their use from either end of the car-motor; also shows the gas-engine mounted on the spring-carriage, the water and gas supply regulators, the exhaust-muffler, and exhaust-consumer; also shows the gearing on one of the axles. Fig. 8 is a view of one of the driving-shafts, showing two universal joints, the gearing, and two speed chain-wheels, together with their clutches for operating the same; also shows the position of the rods which are to operate the said clutches from either end of the car-motor. Fig. 9 shows the end of one of the driving-levers and shows the notch in said lever to engage it with a catch in the socket. Fig. 10 is a side view of the spring-carriage. Fig. 11 is a rear elevation of Fig. 10. Fig. 12 is a plan of Fig. 11, showing the position of the car-motor wheels and axles and spring-carriage. Fig. 13 is a plan view of the pedestals which are attached to and run upon the car-axle. Fig. 14 is a side elevation of Fig. 13. Fig. 15 is a part sectional elevation of the crank-axle of the engine-motor; shows the energizer friction-clutch and the driving-clutch in sections; also shows the double sprocket-wheel for the endless chains. Fig. 16 is a side elevation of the energizer-clutch, showing the stationary eccentric and its strap connected to the lever which causes the same to open and close the friction-brake strap (shown in dotted lines) when in action. Fig. 17 is a view showing the position of the two speed-wheels on their shaft, also the clutches for operating them. Fig. 18 is a plan (in part section) of the beveled pinions; shows the rods belonging to the brakes; shows the supporting-arm of the line-shaft and the escapement which is placed in the beveled wheels. Fig. 19 shows the escapement-pawls which belong to the beveled pinions. Fig. 20 is a cross-section of Fig. 19. Fig. 21 is an elevation showing the universal joints which belong to the line-shafting and the relative position of the draw-bar. Fig. 22 is a plan of the car-motor and its trailer coupled together; shows the position of the spring-carriage, the beveled gears provided with the supporting-arm, which takes hold at the center of the car-axle, the universal joints and coupling devices arranged to the center of the trailer and to the axle of the trailer; also shows an endless chain transmitter between the two axles, one on the car-motor and one on the trailer; shows the couplings which can be used to couple the car and motor from either end; also, the sockets for the driving-levers at both ends of the car-motor. Fig. 23 is a side elevation of Fig. 22, taken on the line $x$ $x$. Fig. 24 is an equivalent line-shafting for the transmission of power from the engine to the driving-wheels; shows an intermediate shaft with supporting-arms, beveled gears provided with escapements mounted on a frame on the car-axle, said beveled gears operated by line-shafts, universal joints, and reverse-levers to give traction to the motor. Fig. 25 is a side elevation of Fig. 24. Fig. 26 is a cross-section on line $y$ $y$, Fig. 24. Fig. 27 is an enlarged view showing the gearings, universal joints, and beveled pinions; shows the position at which they are placed; also, the escapement. This latter is shown in dotted lines. Fig. 28 is a view of the long-tooth gear-wheel. Said wheel takes the place which is indicated by dotted lines when one beveled gear is put out of gear and the other one is put into gear in the action of reversing the car-motor. Fig. 29 is a view of the universal joint provided with spring-cushions. Fig. 30 is a side view of Fig. 29. Fig. 31 is a sectional side view of the beveled pinions and axle-gear, showing the supporting-clutch of the car-motor. Fig. 32 is a plan of Fig. 31. Fig. 33 shows the line-shafting, central gears, and universal joints and the position of the car-wheels, (in dotted lines.) Fig. 34 is a view of the link which gives the change of direction of motion to the reverse-lever. Fig. 35 is an enlarged view of the central gear, as shown at Fig. 33, showing a space at the side thereof for this gear to be adjusted with an escapement device. Fig. 36 is a plan view showing the beveled wheels covered in.

My improved motor is provided with a spring-carriage A. This carriage rests upon springs $c$, which are upon the pedestals $A'$ $A^2$. These pedestals are placed on one of the axles $B^2$. The other end of this spring-carriage A is supported by a spring and bolt $A^4$ at T on the truck S of the car-motor. This truck S is provided with the usual car-springs and journal-boxes which support that class of vehicle. (See Figs. 7, 10, 12, 23, and 25.) Mounted on this spring-carriage A and carried by it is an engine-motor, which is here shown as an upright gas-engine $A^4$. (This can be an oil-engine or any motive power.) To supply this gas-engine $A^4$, there are provided double gas-regulators $m^4$ $m^5$. These regulators are supplied with gas from a gas-tank $m$ of high-pressure gas, which is to be re-regulated to proper pressure for use of the gas-engine. As before stated, the tank $m$ is provided with the pipe $m'$. This pipe runs to each of the regulators $m^4$ $m^5$; but between the regulators and this pipe there is provided the valve $m^2$ $m^3$, so as to enable the gas to be turned off from either of the regulators. Beyond the regulators are the stop-valves $m^6$ $m^7$, which are provided to further regulate the flow of gas after it has passed the regulators. (See Letters Patent No. 365,273, dated June 21, 1887.) One of the regulators, $m^5$, is connected, by the pipe $m^8$, to the double lighting-tubes $m^9$ $m^{10}$ on the cylinder of the gas-engine. It also connects to the flame-lights $m^{11}$ and to the exhaust-consumer W, and the other regulator, $m^4$, is connected, by a pipe $m^{12}$, to the elastic gas-bag $m^{13}$, and this bag connects with the cylinder belonging to the gas-valve of the gas-engine $A^4$.

The water-tank N is connected by pipes $n$ $n'$ to the upper and lower parts of the cylinder of the gas-engine, so as to keep up a circulation of water with which to keep cool said cylinder. The products of combustion, being the exhaust of the gas-engine $A^4$, are carried by a pipe O to the ordinary exhaust-pot $o$, thence by pipes to the muffler $O^2$. This muffler consists in a series of cylinders $o^2$ $o^3$, (shown in dotted lines,) one placed inside of the other, and the exhaust-pipe is made to enter the center or innermost of the cylinders. These cylinders are bored full of holes for the exhaust to pass through. Thence it is carried to the top $o^5$ and here connects to a pipe $O^6$. It is understood that these pipes are of suitable size for the purposes for which they are used. Pipe $O^6$ carries the product of the exhaust through the consumer-furnace W. This furnace is filled or charged with lighted charcoal, so as to still further burn up the exhaust, the products of which in an engine of this class do not alone consist of carbonic acid and water, but of blacks, unburned oil used in lubricating the cylinder, and often a charge of gas which failed in ignition, all of which are to be consumed in the gas-consumer, and a jet-flame is placed in the consumer, so as to aid to keep up combustion in the same. It passes through this charcoal to a second chamber, (marked as $W'$,) which I call an "odorizer." This odorizer will be connected to a pipe which carries the products of the exhaust either out at the top of the car or underneath, as the case may be, thus getting rid of the exhaust of the gas-engine.

The water and gas supply tanks, the regulators, the exhaust-muffler, furnace-consumer, and odorizer can all be carried by independent springs on the spring-carriage A, or they may be carried by the car-motor S. If this latter plan is carried out, the gas-pipes $m^8$ $m^{12}$, the water-pipes $n$ $n'$, and the exhaust-pipe O will be provided with elastic couplings, so as to make up for the unequal movement of the car-motor S and the spring-carriage A. The tanks $m$ N can be placed on top of the car, (see Figs. 1 and 2,) or they may be placed along the center of the car.

The crank-axle shaft $A^5$ of the gas-engine $A^4$ has keyed to it a fly-wheel $A^6$, and said crank-axle $A^5$ is carried in journals $A^7$ $A^8$, which are upon the spring-carriage A. The cylinder of the gas-engine $A^4$ is supported by upright columns $c^4$, which rise from the spring-carriage A. I propose to cast this carriage and the upright columns in aluminium to save weight. At the side of the carriage A are placed the well-known cups $a$ $a'$, which are capable of taking and holding additional springs to carry the tanks, gas-regulators, water supply and exhaust mufflers and consumers. Loosely mounted and resting at one end on the crank-axle shaft $A^5$ is an intermediate shaft $A^9$. (See Figs. 7 and 15.) One end of the shaft $A^9$ rests in the journal $A^{10}$, which belongs to the spring-carriage A. (See Figs. 10 and 12.)

Keyed onto the crank-axle shaft $A^5$ is a drum $A^{11}$. This drum is made to cover in or envelop a strap friction-clutch. This strap is shown in dotted lines. (See Fig. 16.) At the side of the journal $A^7$ and bolted to it is the stationary eccentric $A^{12}$. The bore in this eccentric is large enough to permit the crank-axle shaft $A^5$ to freely revolve therein. The stationary eccentric $A^{12}$ is provided with the strap $A^{13}$, which revolves with the drum $A^{11}$—that is, it is connected to a lever $A^{14}$, which said lever is rigidly connected with a rock-shaft $A^{15}$, and this rock-shaft $A^{15}$ is journaled in and carried by the drum $A^{11}$, so that the revolution of the drum $A^{11}$ makes the strap $A^{13}$ revolve around the stationary eccentric $A^{12}$, and by this construction there is given a vibratory motion to the rock-shaft $A^{15}$ by the lever $A^{14}$, and in this way and manner the rock-shaft $A^{15}$, is provided with the lever $A^{16}$, (shown in dotted lines, Fig. 16,) which connects to a strap $A^{17}$ of a friction-clutch, and as before said, in this way the strap $A^{17}$ is made to constantly open and close on a wheel $A^{18}$; this said wheel being provided with flanges and being keyed to the intermediate shaft $A^9$, so that every time the strap $A^{19}$ is closed or tightened on this said wheel $A^{18}$ connection is made between the crank-axle shaft $A^5$ and the intermediate shaft $A^9$. This action is especially arranged so as to relieve the crank-axle shaft and its fly-wheel of the strain of moving the motor while the gas-engine is receiving the effect of the explosion or expansion in the cylinder thereof, so that the fly-wheel shall be energized in the most natural and economical condition for it to receive energy—that is to say, free from a working load—and by this means the rim of the fly-wheel is always restored to a full rim speed and the position of the forces in the rim of the fly-wheel become a potential lever of the length equal to the radius of that rim, and when closed and connection is made to the intermediate shaft $A^9$ runs the gearing of the motor, should the friction-brake, which is under control of the driver of the motor, be in contact. It would be hardly possible for the pressure of the explosion of the gas-engine which takes place in the cylinder thereof to force along the car-motor and its trailer and restore rim speed to the fly-wheel $A^6$; but when the wheel is released, as in the manner set forth, the gas-engine will maintain that wheel at proper velocity or rate of speed, and that force will intermittently drive the gearing of the motor.

Double lighting-tubes $m^9$ $m^{10}$ are provided for the cylinder of the gas-engine. These can be either the plain lighting-tubes shown or double electric igniters, two to each cylinder. The object of this improvement is that there shall be two sparks carried into the cylinder, so as to insure the ignition of the charge of compressed air and gas.

Upon shaft $A^9$ is keyed the wheel $A^{19}$. This wheel is flanged and is operated by a similar strap friction-clutch. The ends of the strap $A^{20}$ are carried by the lever $A^{21}$ on a rock-shaft $A^{22}$, and the other end of said strap is made to attach to the drum $A^{23}$. Said rock-shaft is enveloped, carried, and journaled in the drum $A^{23}$. The hub of this drum $A^{23}$ is arranged so as to be provided with sprockets $A^{24}$ $A^{25}$. As shown, drum $A^{23}$ is loosely mounted. Loosely-mounted disk $A^{27}$, with a loosely-mounted collar $A^{28}$, is upon shaft $A^9$ and is operated by the driving-lever of the car-motor. Connected to disk $A^{27}$ is link $A^{29}$. This connects a chain-eye $A^{30}$ to lever $A^{31}$, and this lever is rigidly attached to rock-shaft $A^{22}$, and by moving back and forth the disk $A^{27}$ on shaft $A^9$ the drum $A^{23}$ is made to be connected or attached to shaft $A^9$, and it is clear that the driver of the car-motor by closing the friction-clutch under his control makes the connection on shaft $A^9$; but the operation of the fly-wheel $A^6$ will be uninfluenced by the working load while receiving the force of the products of combustion, and this fly-wheel will be connected to shaft $A^9$ to expend its energy through the friction-clutch, (not under control of the driver,) but operated by the energizer. Thus when both clutches are closed the gearing of the motor will receive the momentums of the fly-wheel $A^6$ through the endless chains connecting the same, and the momentums of the car itself will be found ample to continue the movement of the car during the rapid releases and attachments which are made by the stationary eccentric for the purposes specified. Two endless chains $A^{32}$ $A^{33}$ are connected to the sprocket-wheels $A^{34}$ $A^{35}$. These wheels are loosely mounted on the shaft D. They are also of different diameters, so as to make two speeds to the shaft D when they shall be operated by their respective clutches. The shaft D is mounted and carried in journals $d$ $d'$. These journals are carried by the spring-carriage A. The shaft D has keyed to it the gear-wheel E. There are also provided the clutches $D^3$ $D^4$. These clutches slide on keys on shaft D and are made to engage with the sprocket-wheels $A^{34}$ $A^{35}$, and by the rod constructions either one or the other of the sprocket-wheels revolve shaft D, when in clutch connection, through either of the chains $A^{24}$ $A^{25}$ and sprocket-wheel on shaft $A^9$. As the chains are arranged to reach over and connect with the sprocket-wheels on shaft D, of course the one will be revolved slower or faster, according to its diameter, by the speed given to it by the sprocket-wheel, and the clutch put into gear will give the speed to shaft D. The gear-wheel E intergears with the keyed-on gear-wheel E', (the shaft shown in dotted lines.) This shaft rests and revolves in journals $e\ e'$. (See Fig. 7.) Also keyed on this shaft is a gear-wheel $E^2$, and this gear-wheel connects to a universal joint $D^2$, which is provided with the projecting arm $D^{10}$, connecting-link $D^{12}$, and the connection $D^{11}$, which is keyed onto shaft $D^9$, and a removable arm $D^8$ (made in two parts on either side of the beveled gears) is hinged to the car-axle $B'$. The shaft $D^9$, which is carried by the before-mentioned arm, has keyed to it (said shaft) the beveled pinion $D^{13}$. On the axle $B'$ are fixed collars to keep the removable arm $D^8$ in a central position. The beveled pinion $D^{13}$ is arranged so as to engage beveled pinions on either side, whichever one it may be desirable to put into gear for the purpose of moving the car-motor either forward or backward. The beveled pinions here provided are constructed with an especially-designed escapement. They are lettered $D^{14}$ $D^{15}$. (See Figs. 18, 19, and 20.) These beveled wheels are also of the split-pinion class and are mounted on a sleeve, one to each pinion, and designated as $D^{16}\ D^{17}$. These sleeves are loosely mounted on the car-axle $B'$, and there are provided on the axle the long keys $b\ b'$. The sleeve $D^{16}$ is provided with a ratchet's $D^{18}$, and the direction of a similar ratchet's teeth is reversed in sleeve $D^{17}$, belonging to the outer pinion-wheel. The ratchet's teeth are operated upon by pawls $D^{19}$. Said pawls are hinged to the beveled pinions. (Both pinions are alike in this respect, but the pawls point in different directions.) Springs $D^{20}$ are provided to hold these pawls into the ratchet's teeth in either of the pinion-wheels.

In this manner the pinion-wheels $D^{14}\ D^{15}$ are each provided with escapement devices, so that when the said pinions are put into gear with the beveled pinion $D^{13}$, for the purpose of driving the car-motor, the escapement-ratchets will be in proper position to give forward motion to the motor and at the same time permit the motor to have an independent action in the same direction, as in the instance of coasting downhill. The car-wheels, as $B^3\ B^4$, are provided with suitable brake-shoes. Also mounted on this axle $B'$ is an additional removable arm $B^5$. (See Fig. 7.) This arm is to support the shaft $B^6$ and has keyed to it a beveled pinion $B^7$. This wheel will engage with either the teeth of the pinion-wheels $D^{14}\ D^{15}$, whichever may be in gear or brought into a position to be in gear, and by this construction the shaft $B^6$ is for the purpose of transmission of power to the trailer, which may be attached to the car-motor. The gear-wheels $E\ E'\ E^2\ D^{13}\ B^7$ can all be of raw-hide or vulcanized fiber to prevent noise, and they can be covered in inside of a case reaching around the axle $B^2$, as is shown in a similar way around a supporting-axle. (See Fig. 36.) One end of the shaft $B^6$ rests in a universal joint $B^8$. This joint is provided with the projection $B^9$, connected to the link $B^{10}$, and this link connects to the projection $B^{11}$ on the shaft $B^6$. The universal joint $B^8$ here shown is made to be a double joint and face the other way also, so that the projection $B^{12}$ connects to a link $B^{13}$. This link connects to the projection $B^{14}$ on the shaft $B^{15}$. This shaft is provided with the square coupling-cup $B^{16}$—that is to say, there is a cup which is provided with a square opening. Into this coupling is placed a square link $B^{18}$. (See Figs. 2, 3, 4, and 5.) This coupling-cup has the loose collar $B^{19}$ and links $B^{20}$ to connect it to the draw-bar F. One end of the shaft $B^{15}$ is at the universal joint $B^8$ and the other end is held by the loose collar $B^{19}$. This permits the shaft $B^{15}$ to freely revolve, and the square opening, when provided with the link $B^{18}$, conveys the power to a similar coupling-cup and opening $B^{25}$, which is upon the trailer.

The draw-bar F is pivoted at $F'$, and the center of this pivot is made to pass as nearly as possible through the center line of one of the universal joints $B^8$. This is for the purpose of allowing the draw-bar F and the revoluble shaft $B^{15}$ to swing together to either side when the car-motor and trailer are turning curves. (See Fig. 21.) The shaft $B^6$ can also have the loose collar $B^{22}$ to rest on brace-pieces, such as are shown at $B^{23}$. (See Figs. 2 and 3.) The shaft $B^{24}$ is provided with the coupling-cup $B^{25}$ and loose collar $B^{26}$. There is also provided the connecting-chain $B^{27}$ to connect to the draw-bar $B^{28}$ of the trailer-car. (See Fig. 1.) There is also provided here a brace-piece $B^{29}$. The double universal joint $B^{30}$—that is to say, universal joint at each end of the shaft—connects at one end with the shaft $B^{31}$, and a removable arm $B^{32}$, which is hinged on the axle $B^{33}$, forms the support for the shaft $B^{31}$. On this axle are the two beveled gear-pinions provided with escapement devices and indicated by $B^{34}$ and $B^{35}$. (See Fig. 22.) Also on the axle $B^{33}$ there is a chained sprocket-wheel $B^{36}$. This sprocket-wheel is provided with a reversible escapement. Upon this sprocket-wheel is an endless chain $B^{37}$. This chain connects over to the reversible escapement chain sprocket-wheel $B^{38}$, which is mounted on the car-axle $B^{39}$. Referring to the motor-car, at the other end thereof there is the double universal joint $B^{40}$. This is of the construction heretofore explained, and this will enable the car-motor to be coupled at either end and then transmit power to the driving-wheels of the trailer-cars. The shaft $B^{41}$ connects to this double universal coupling $B^{40}$, as shown, and passes to another universal coupling $B^{42}$. (See Fig. 7.) This coupling is on shaft $B^{43}$, and this shaft is journaled and supported by journals $B^{44}$ and $B^{45}$, which are carried by the spring-carriage A. All the parts which are underneath this carriage are covered in. At the end of the shaft $B^{43}$ is a gear-wheel $B^{46}$. This wheel intergears with the gear-wheel $E^2$.

As a modification of the arrangement of the shaft $B^{41}$, and by reference to Fig. 8, in which there is shown the shaft D, provided with two universal joints, one at each end, and when it is so provided the shaft $B^{41}$ can reach directly from the universal joint $B^{40}$ over the axle $B^2$ and to the universal joint which is at one end of the shaft D, and by this arrangement the shaft $B^{42}$ and its attachments are dispensed with, also the gear-wheels $E'$, $E^2$, and $B^{46}$, and by this construction and modification in which the shaft D is provided with the double universal joints the shaft $D^9$ will have to reach up to the universal joint $D^2$, placed on shaft D.

Another modification is to retain the gear-wheel E on the shaft D and place at the side thereof a gear-wheel G. (See Figs. 23 and 25.) This gear-wheel G is mounted upon a shaft which is provided with two universal joints $G'$ $G^2$, and this shaft is journaled and carried at $G^3$ $G^4$, which are upon the frame S of the truck of the car-motor. An endless chain may pass between the shaft D with sprocket-wheels to take the place of the gear-wheels E and G. Shaft $G^5$ is attached to one of the universal joints and is arranged to pass back to one end of the car-motor, and is provided with the gear-wheel $G^6$. Intergearing with this gear-wheel is the gear-wheel $G^7$. These wheels are for the purpose of making the position of a universal joint here shown become central at the rear of the car-motor truck S.

The universal joint $G^9$ is provided with the shaft $G^{10}$. A removable arm $G^{11}$ is made to support the shaft $G^{10}$, and this arm is hinged to a shaft $G^{12}$. This said shaft is journaled and carried on a removable arm $G^{13}$, and this arm is hinged to the car-axle $B'$, and the other end is carried by the truck S of the car-motor.

At $G^{14}$, (see Fig. 25,) upon the shaft $G^{12}$, are mounted two escapement beveled pinions $G^{15}$ $G^{16}$, also a long-tooth gear-wheel $G^{17}$, (see Fig. 28,) and a channeled disk $G^{18}$, all of which are mounted upon the one shaft, as specified. The channeled disk $G^{18}$ is provided with a yoke or bell-crank, which is for the purpose of reversing the action of the shaft $G^{12}$. This is done by putting in or out one of the beveled gears, and, as before explained, these beveled pinions or gears are provided with the escapements, and the long-tooth gear-wheel $G^{17}$ is continuously intergeared with the gear-wheel $G^{57}$. This is so that in the act of reversing the motor the gear-wheel $G^{17}$ will be kept in gear even should the car be moving. So as to retain the arm $G^{11}$ central of the action the links $G^{20}$ are provided, and these are made to be loosely mounted at the central collars which are upon the axle $B'$. The universal joints $G'$ $G^2$ are provided with the line-shaft $G^{21}$. This is connected over to the universal joint $B^8$, which is the same one as is set forth in Fig. 21. The power is transmitted between the car-motor and its trailer by constructions similar to those which have heretofore been described. A change can be made at the universal joint $B^{30}$ by providing it with the shaft $G^{32}$. This shaft takes the place of the shaft $B^{31}$. (Shown in Fig. 22.)

Again referring to Fig. 24, the shaft $G^{32}$ is carried over to the universal joint $G^{33}$. (See Figs. 31, 32, and 33.) A shaft $G^{34}$ (shown in dotted lines) is provided with the gear-wheel $G^{35}$ and a second universal joint $G^{36}$. It is supported in and by the journal $G^{37}$ $G^{38}$. At the side of the gear-wheel $G^{35}$ is the gear-wheel $G^{41}$. This wheel is mounted on a shaft $G^{42}$ (shown in dotted lines, see Fig. 27) and is supported in journals $G^{39}$ $G^{40}$. These four journals $G^{37}$ $G^{38}$ $G^{39}$ $G^{40}$ are carried by the braces which belong to the running-gear of the truck of the car. (See Figs. 26 and 27.) The gear-wheel $G^{35}$ can be one which is provided with an escapement device. (See Fig. 34.) The space at the side of the wheel is for the purpose of this escapement, which consists of the ratchet and pawl, such as have been heretofore shown as belonging to the beveled gear-wheel.

The gear-wheel $G^{35}$ intergears with a central gear-wheel $G^{41}$. This gear-wheel is mounted on the shaft $G^{42}$, as before explained. The gear-wheels $G^{41}$ $G^{35}$ can both be split wheels, if desired. The shaft $G^{42}$ is provided with two universal joints $G^{43}$ $G^{44}$, one at either end. All the universal joints used in the construction herein shown can be provided with springs, as shown in Fig. 29, so as to make a yielding action when in use. These joints are provided with the springs $g'$ $g^2$. These are provided with the central bolt and are made to act in either direction, as they are arranged on either side of the projection $g^3$. A loosely-mounted collar $g^4$, provided with a projection $g^5$, is made to come in contact with the springs before mentioned or pull against them.

The universal-joint cup is rigidly attached to the shaft, and the loose collar $g^4$ has the projection $g^5$, and this couples to the link $g^6$. This link connects to the projection $g^7$, which is upon the shaft $g^8$, and forms the universal joint with an elastic action. It can be made in this way, if desired. The projection $G^{45}$ couples to the link $G^{43}$, and this link couples to the projection $G^{47}$ on the shaft $G^{48}$. This shaft is provided with the removable arm $G^{49}$ and is supported thereby, and this arm is hinged to the shaft $G^{50}$. Keyed to this shaft are the beveled pinions $G^{51}$ $G^{52}$. These pinions intergear with the gear-wheel $G^{53}$, which is keyed onto the shaft $G^{48}$. The beveled pinions here shown have the channel at the sides to receive the yoke, which is for the purpose of sliding them back and forth, and with them the shaft $G^{50}$. It is possible to place the gearing as is shown in Fig. 24 to take the place of the gearing shown here. The links $g^9$ $g^{10}$ connect to a box $g^{11}$, which is loosely mounted on the axle $B^{39}$. The shaft $G^{50}$ is carried by and journaled on the frame $G^{55}$, which said frame is loose on the axle $B^{39}$. The other end of this frame $G^{55}$ is supported by the truck of the street-car at $G^{56}$. The ordinary electric-car gear-wheel $G^{57}$ is made to intergear with the long-tooth gear-wheel $G^{17}$. The universal joint $G^{36}$ is connected, in the way and manner as hereinbefore fully described, to the shaft $G^{58}$. This reaches over to a universal joint $G^{59}$. (Shown in dotted lines, Fig. 32.) This latter is carried by and journaled on the truck of the street-car.

By the constructions heretofore explained the cars can be coupled from either end and have power transmitted to their driving-wheels for the purposes of traction, and it is understood that the beveled gears will all be arranged so as to be in gear to give one direction of motion to the vehicles, car-motor, and trailer, and all the beveled gears can be covered in and preserved from dust and injury in the manner and the way shown. (See Fig. 36.) To further carry out the object of the invention, chain connections $B^{37}$ are between the wheels of the trailer-car and of the motor as one of the equivalent constructions. On the car motor chain $B^{37}$ and the sprocket-wheels $H' H^2$ are upon the axles $B' B^2$. These can be provided with the double escapement-pawls; but when so provided the pawls will have to change the direction of their thrust, so as to make the ratchets to be in the correct position for the direction in which the motor may be traveling. The escapement shown in Patent No. 401,855, dated April 23, 1889, is too far removed from the driving-wheel and causes the teeth of the gear-wheel to thresh. Therefore the escapement is placed as close to the driving-wheels as possible, to relieve the gear of that unnecessary wear and tear.

The driving-lever K is made in two parts and is made to operate from either end of the car-motor. At one end of the car-motor there is a socket $K'$, which is provided with a spring-catch $k$, and the end of the lever K is provided with a tooth to engage with the said spring $k$ and attach it to the socket $K'$. The socket $K'$ is connected to a shaft $K^2$. Said shaft is journaled in the frame of the car and crosses the front of the platform underneath. This shaft has the lever $K^3$ at one end and a similar lever at the other end. The lever $K^3$ connects to the rod $K^4$. This rod has the adjustable link $K^5$ to regulate the length of the same. The rod $K^4$ connects with the lever $K^6$. This lever is on the shaft $K^7$. This shaft also crosses the car-motor to each side thereof, and at each side is a lever $K^8$. These levers connect to links $K^9$, same on either side of the car, and these links are provided with adjustable couplings and connect to links $K^{10} K^{11}$, which form the well-known toggle-joints of the brakes $K^{12} K^{13}$. At the other end of the car-motor the socket $K^{14}$ is provided with the spring-catch $k'$, and the end of this socket $K^{14}$ rests on the shaft $K^{15}$. (See Fig. 18.) This shaft is provided with two levers $K^{16} K^{17}$ and is a duplicate to the shaft $K^2$, which is at the other end of the car. These levers $K^{16} K^{17}$ are hinged to two rods $K^{18} K^{19}$. These rods have the adjustment-links $K^{20} K^{21}$, and the rods connect to the levers $K^{22} K^{23}$, which are upon the shaft $K^7$. From this shaft the two levers $K^8 K^8$ connect to the brakes. The reason the rod $K^4$ is made to take hold of the lever $K^6$ and the rods $K^{18} K^{19}$ take hold of the levers $K^{22} K^{23}$ is that the variation in the position of these levers on shaft $K^7$ make it possible for the same direction in the movement of the lever K to apply the brakes to the car, and, further, the same movement to take off the brake—that is to say, to push out the lever from the car at one end will apply the brakes to the wheels of the car and the trailer, and to bring it back will take them off—or the levers may be arranged as shown, so that to pull back the lever will put on the brake. Shown in dotted lines is the rod $K^{24}$. This rod connects by rods and levers to the loose collar $A^{28}$ on the disk $A^{27}$ and is made to operate the friction-clutch for applying the power of the engine. (See Patent No. 381,847, dated April 24, 1888.) The improvement here made is in having the single lever to operate from either end of the vehicle and preserve the same movement for the same duty in driving the car-motor.

The lever I is made to enter the socket $I'$, and this socket is connected to rod $I^2$. (See Fig. 8.) This connects to a lever $I^3$. These levers are upon a short shaft $I^4$. This shaft is to regulate the position, in connection with the sockets $I'$, of the spring-carriage A, so as to reach around and come by the rods and levers to the lever I. The rod $I^5$ connects to a lever $I^6$. This lever is also provided with a similar shaft $I^7$ for the same purpose, so that when the lever I is made to operate from the other end of the car-motor it will operate the clutches for the same purposes by the same movement. The levers $I^3 I^6$ operate the clutches $D^3 D^4$. Lever I has the other socket, $I^{12}$, with $I^8 I^9$, with which to operate the clutches on shaft D, and by this means the speed of the shaft D is changed with reference to the movement of the motive power. The clutches can be provided with either V-shaped or square teeth. In Fig. 17 the clutches are shown with V-shaped teeth, and in Figs. 7 and 8 the clutches are shown with square teeth.

The pedestals $A' A^2$ are provided with four car-springs $c$, and bolts $c'$ pass through the center and attach the spring-carriage A to the pedestals. These pedestals are placed upon the axle $B^2$. Pedestals $A' A^2$ have a cap $c^2$, which holds them in place on the axle $B^2$. (See Fig. 11.) It is understood that the beveled wheels shown in Figs. 24, 25, 31, and 32 can all be duplicates of each other. The gearing shown in Figs. 21 and 23 can be duplicates of each other. The several views, Figs. 22 and 23 and also Figs. 24 and 25, are placed together, so as to show the variation in the arrangement of line-shafts to transmit power to the driving-wheels for the purposes of traction. By reference to Fig. 6 there is there shown a flexible shaft L as an equivalent means of transmission of power between the cars. The chain support L' connects to a loose collar L² to hold up the flexible shaft L by the draw-bar B²⁸. A piece of chain L³ has a connection (as also shown) to convey power to operate the brakes which are upon the trailing car. There is also shown a flexible pipe L⁴ to convey the gas from one car to the other. (See improvement on Patent No. 5,205, dated July 31, 1847.) There is also provided the toggle-joint action L⁵ L⁶ L⁷, (shown in dotted lines,) which is for the purpose of operating the shafts L⁸ L⁹. These shafts are operated by a lever L¹⁰, which is for the purpose of reversing the car-motor and trailers by changing the direction of motion of the driving-wheel, and it is understood that by the movement of the various beveled gears the ones placed into gear will all be moved by the reversing-levers, so as to take the proper position with which to give the same direction of motion to all the driving-wheels and drive them all from the engine A⁴ for the purposes of traction.

I place the gate U (see Figs. 1 and 6) between the car-motor and its trailers, as shown in Patent No. 381,847, dated April 24, 1888.

In the furnace W for consuming the products of the exhaust is placed charcoal, and I ignite the same. I also supply a flame of hydrocarbon to this charcoal, and I cause the products of the exhaust to pass through this consuming-furnace W. I continue the pipe $m^8$ over to the said furnace W. I then provide the odorizer W' to make a pleasant odor of the exhaust.

The operation of the invention is as follows: Either oil or gas engines are started at the depot and continuously run, notwithstanding the car-motor and its trailer may stop, and by pushing out the driving-lever train connection is made with the friction-clutch, which applies the power of the engine to the shafts and gearing of the car-motor and its trailer. By pulling the lever half-way back the clutches are released from the moving car and the car-motor is free to race downhill, and by continuing to draw back the lever K the brakes are applied to the driving-wheels, and it is very evident that the arrangement of the levers can be such that to push out the lever will apply the brakes. By removing the lever from the front end of the car and placing it in the socket which is at the back end of the car the said car-motor can be equally well driven and operated by the driver. The furnace to consume the products of the exhaust can be lined with asbestos and the exhaust can be used for heating purposes in the winter.

What I claim as my invention, and desire to secure by Letters Patent of the United States, is as follows:

1. In a traction-motor a driving-axle provided with driving-wheels, a sliding beveled pinion, suitably retained thereon, a removable arm, provided with removable intermediate shafts, a motive-power shaft provided with speed-giving sprocket-wheels and a motive-power engine all operating, as set forth, and mounted in the spring-carriage described.

2. In a traction-motor, a driving-axle provided with sliding beveled pinions, said beveled pinions provided with pawl-and-ratchet escapement device, also an intermediate supporting-shaft provided with the beveled pinion and journaled as shown, substantially as and for the purposes set forth.

3. In a traction-motor a driving-axle provided with two beveled pinions, also an intermediate shaft supported by an intermediate frame on said axle and provided with means of reverse, a beveled operating gear-wheel and the long-tooth gear-wheel combined with the gear-wheel on the axle, substantially as and for the purposes set forth.

4. A traction-motor provided with a driving-lever, said lever provided with a catch to engage in a socket, said sockets at each end of the traction-motor, said sockets combined by rods to angle-pieces, as shown and for the purposes specified, from thence rodded to the brakes of the driving-wheels of the motor, also provided with rods connecting to angle-pieces for the purposes shown, and with rods connected to the clutch of the friction-brake on the motor, as and for the purposes described.

5. In a traction-motor provided with the driving-wheels the combination of the removable arm on the driving-axle, also gear-wheels keyed on said axle, a shaft provided with beveled pinions a gear-wheel and a second removable arm to support said intermediate shafts, said shaft connected to universal joints on a power-driven shaft, said power-driven shaft provided with two speeds and operated by two friction-clutches, substantially as and for the purposes set forth.

6. The combination in a traction-motor and vehicle of a crank-axle shaft, supporting the spring-carriage, A, as shown, an engine-motor, A⁴, and fly-wheel, A⁶, a friction-brake automatically attaching a second shaft, said second shaft operated by a friction brake and clutch and sprocket chain wheel, said clutch connected by rods to the driving-lever, on one motor, substantially as and for the purposes set forth.

7. The combination in a motor-vehicle provided with springs of a second spring-carriage mounted on springs on the axle and upon the frame of the vehicle, as shown, provided with an engine-motor an automatic friction-clutch and lever-operated friction-clutch, two speed-gears and clutches connected by rods to driving-levers, the power of said motor applied to the driving-wheels of the motor, substantially as and for the purposes set forth.

8. The combination in a motor-vehicle of the hydrocarbon-engine provided with an igniting device, an exhaust-pot, a muffler, an exhaust-consumer, a water-tank connected to the cylinder of the gas-engine, said gas-engine supplied with gas from a tank by and through regulators, substantially as and for the purposes set forth.

9. In a traction-motor provided with beveled pinions said beveled pinions provided with escapements, driving-pinions supported by removable arms, shafts and universal joints, for the purposes set forth.

10. In a street-car motor or traction-vehicle, the gas-regulators to supply double streams of regulated gas, to the cylinder and flame-lights of the gas-engine; the exhaust-pot and muffler, the exhaust-consumer, all operated for the purposes described.

11. In a traction-motor the crank-axle shaft, $A^5$, provided with a friction-brake, said friction-brake connecting to a friction-wheel keyed to the shaft, $A^9$, said wheel enveloped by a case free to revolve in connection with the gearings of the motor, said case provided with the strap-friction, also two chain sprocket-wheels rigidly connected thereto, supported in journals by a spring-carriage, said spring-carriage supporting a driven shaft, D, operated by endless chains connected by clutches, as shown, said shaft provided with gear-wheels or universal joints to the gearing on the wheels of the motor; operating-levers connected to either end of the car-motor, substantially as and for the purposes set forth.

12. In a traction-vehicle or street-car motor, the draw-bars with coupling-links, as shown, sustaining and carrying the revoluble shafts, said shafts provided with square openings in their adjoining ends, an oblong link, $B^{18}$, to couple the revoluble shafts, as shown and for the purposes set forth.

13. In a street-car motor or traction-vehicle the combination with the draw-bars and links, as shown, of the collar, sustaining and supporting the flexible shaft, the shaft coupled as shown between the motor and trailer, for the purposes set forth.

14. In a street-car motor or traction-vehicle, the combination as follows: two vehicles provided with central draw-bar and coupling-links, capable of operating from either end of said vehicle, said draw-bars provided with connections to loosely-mounted collars on revoluble shafts, to sustain said shaft, said shafts also provided with coupling-link and universal joints, substantially as and for the purposes set forth.

15. The combination with the crank-axle shaft, $A^5$, fly-wheel, $A^6$, the loosely-mounted drum, $A^{16}$, the friction-strap, $A^{17}$, and connecting levers and straps to the stationary eccentric for the purposes described, the intermediate shaft, $A^9$, provided with the two keyed-on friction-wheels, $A^{18}$, $A^{19}$, the chain-sprockets, $A^{25}$, $A^{26}$, and the friction-clutch, $A^{27}$, all supported by journals as shown, and operated as and for the purposes specified.

16. In a street-car motor or other vehicle, the spring-carriage, A, mounted on springs resting on pedestals on the axle, a single bolt passing through said springs to attach them to the spring-carriage, as shown; the other end supported by a spring which rests on the frame of the truck of the vehicle, said carriage provided with an engine-motor provided with two speeds and operated by friction-clutches, substantially as and for the purposes set forth.

17. In a street-car motor or other vehicle a furnace as an exhaust-consumer, substantially as and for the purposes set forth.

18. In a street-car motor or other vehicle the exhaust-consumer being a furnace and the exhaust-muffler consisting of several cylinders one within the other perforated with holes, as and for the purposes set forth.

In testimony whereof I affix my signature in presence of two witnesses.

BENJAMIN CHARLES POLE.

Witnesses:
 WM. M. CARLETON,
 CHAS. P. SWETT.